United States Patent
Tiquet et al.

(10) Patent No.: US 7,445,863 B2
(45) Date of Patent: Nov. 4, 2008

(54) FUEL CELL WITH HELICAL STRUCTURE

(75) Inventors: Pascal Tiquet, Grenoble (FR); Didier Marsacq, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 637 days.

(21) Appl. No.: 10/484,041

(22) PCT Filed: May 23, 2003

(86) PCT No.: PCT/FR03/01569

§ 371 (c)(1),
(2), (4) Date: Jan. 16, 2004

(87) PCT Pub. No.: WO03/100896

PCT Pub. Date: Dec. 4, 2003

(65) Prior Publication Data

US 2005/0069752 A1    Mar. 31, 2005

(30) Foreign Application Priority Data

May 27, 2002   (FR) .................................. 02 06422

(51) Int. Cl.
*H01M 8/10* (2006.01)
(52) U.S. Cl. ..................... 429/31; 425/436 R
(58) Field of Classification Search ........................ None
See application file for complete search history.

(56) References Cited

U.S. PATENT DOCUMENTS

| 3,467,553 | A | | 9/1969 | White |
| 5,221,542 | A | * | 6/1993 | Coetzer ................... 425/436 R |
| 5,336,570 | A | * | 8/1994 | Dodge, Jr. ..................... 429/31 |
| 7,033,694 | B2 | * | 4/2006 | Champion et al. ............. 429/34 |

FOREIGN PATENT DOCUMENTS

| DE | 296 11 057 | | 10/1997 |
| DE | 296 11 057 | U1 | 10/1997 |
| JP | 2002-008683 | | 1/2002 |

OTHER PUBLICATIONS

Patent Abstracts of Japan, Wakana Kojiro, "Solid Electrolyte Type Fuel Cell", Publication No. 2002008683, Publication Date: Jan. 11, 2002, 1 page.

* cited by examiner

*Primary Examiner*—Patrick Ryan
*Assistant Examiner*—Keith Walker
(74) *Attorney, Agent, or Firm*—Pearne & Gordon LLP

(57) ABSTRACT

The invention concerns an elementary cell (1) for a fuel cell comprising two electrodes between which an ion exchange membrane (20) is positioned. According to the invention, one of the two electrodes has a threaded surface carrying the ion exchange membrane (20), the assembly formed by this electrode and the ion exchange membrane (20) being able to be assembled by screwing onto a threaded surface belonging to the other of the two electrodes.

Figure 1:
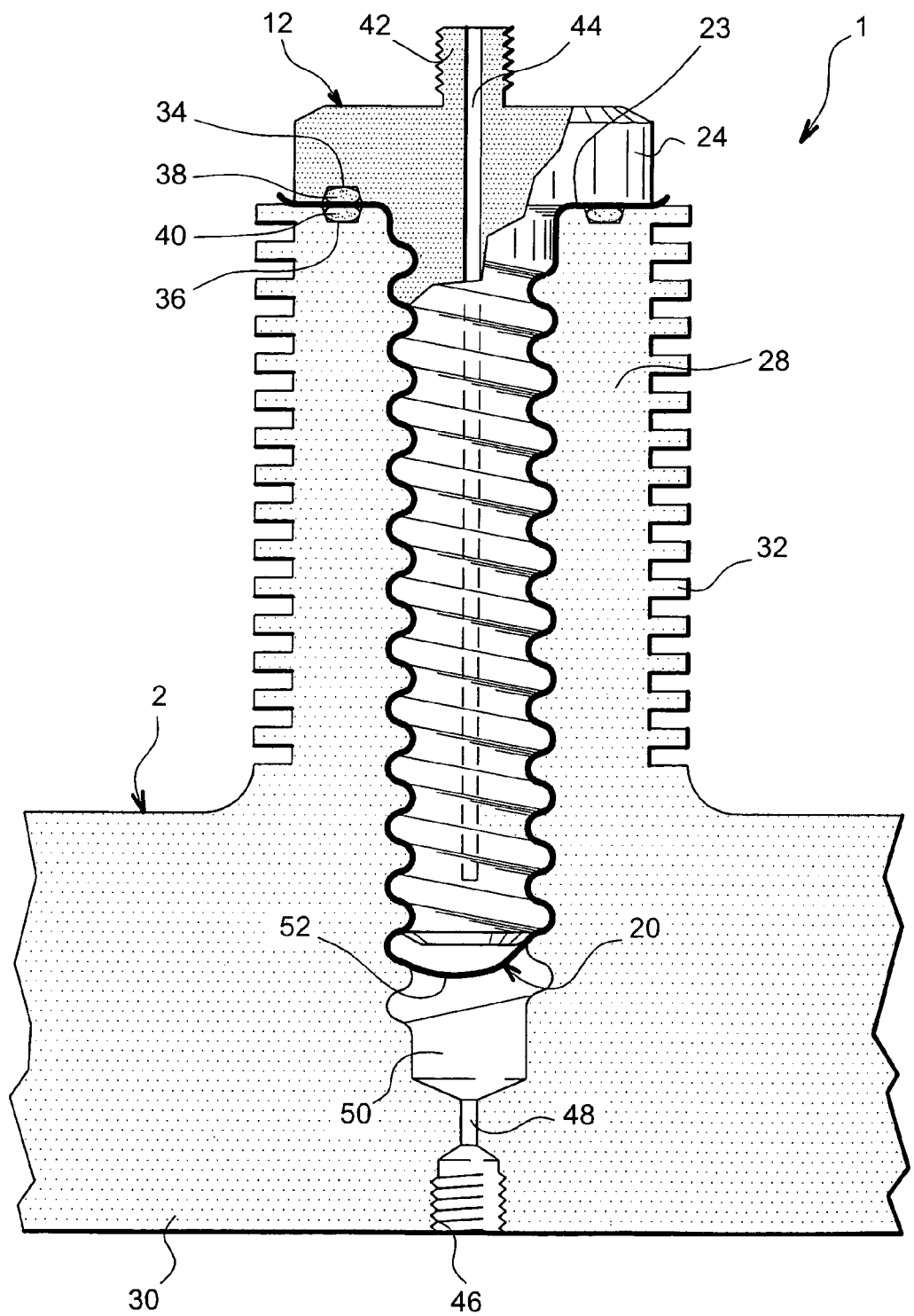

The invention also concerns a fuel cell provided with a plurality of elementary cells (1).

9 Claims, 2 Drawing Sheets

US 7,445,863 B2

FUEL CELL WITH HELICAL STRUCTURE

TECHNICAL FIELD

The present invention relates to a fuel cell comprising as electrolyte a membrane of ion exchange type, and more specifically a proton exchange membrane.

More particularly, the invention concerns elementary cells for fuel cells and their methods of manufacture, the elementary cells also called "electrode-membrane-electrode" assemblies conventionally comprising two electrodes between which the ion exchange membrane is positioned.

By way of example, the invention finds application in the area of fuel cells of PEMFC-type ("Proton Exchange Membrane Fuel Cell), of DMFC-type ("Direct Methanol Fuel Cell") or further of alkaline anion exchange type.

PRIOR ART

Generally, a fuel cell comprises a stack of elementary cells, inside which an electrochemical reaction takes place between two reagents added continuous fashion. The fuel, such as hydrogen for cells functioning with hydrogen/oxygen mixtures, or methanol for cells functioning with methanol/oxygen mixtures, is brought into contact with the anode, whereas the oxidant, generally oxygen, is brought into contact with the cathode. The two electrodes are separated by an electrolyte, of ion exchange membrane type. The electrochemical reaction, whose energy is converted into electrical energy, splits into two semi-reactions:

oxidation of the fuel occurring at the anode/electrolyte interface which, in hydrogen cells, produces H+ protons crossing through the electrolyte in direction of the cathode, and electrons which join up with the outer circuit so as to contribute towards the production of electrical energy;

reduction of the oxidant occurring at the electrolyte/cathode interface producing water in hydrogen cells.

The electrochemical reaction, strictly speaking, takes place at an electrode-membrane-electrode assembly.

To ensure the operation of electric equipment, it is necessary to obtain electric power that is largely greater than the power delivered by a single elementary cell or electrode-membrane-electrode assembly. On this account electrode-membrane-electrode assemblies are most often arranged stacked fashion, the electric continuity between the different assemblies being ensured by means of conductor plates, named bipolar plates. These bipolar plates, preferably made in graphite or stainless steel, ensure the electric junction between the anode of an electrode-membrane-electrode assembly and the cathode of the adjacent assembly. In this way they can ensure the greatest possible electric conductivity so as to avoid ohm drops detrimental to the yield of the fuel cell.

In this way each electrode-membrane-electrode assembly is confined between two bipolar plates, these also fulfilling the function of reagent distribution to the electrodes, and possibly having cooling members to cope with any overheating of the stack.

In addition, known fuel cells of the prior art generally have "press-filter" architecture, corresponding to a specific concept in which the bipolar plates and elementary cells have planar surfaces assembled one on the other by being clamped together. Also, in conventional fuel cells of the prior art the bipolar plates comprise a network of channels winding over the entire surface in contact with the elementary cell, in order to ensure the most homogeneous reagent distribution possible in the direction of a cell electrode.

However, after conducting optical analyses under polarized light, it has been found that the clamping operation of the bipolar plates onto an elementary cell leads to deformations of the ion exchange membrane.

The analyses conducted made it possible to locate the deformations of the membrane in zones positioned at the channels of adjacent bipolar plates, these channels initially being provided for the passage of the reagents. The deformations found are largely accounted for by the non-homogeneity of the mechanical demands placed upon the membrane-during the clamping operation, these demands generally being focused on the membrane portions opposite the solid parts of the bipolar plates separating the various channels. It is specified that when the clamping operation is completed and the elementary cell is held in position, the deformed parts of the membrane are blocked inside these channels, thereby considerably reducing the lifetime of this membrane and of its associated elementary cell.

In addition, when the elementary cell is in operation, it has also been noticed that the ion exchange membrane has a propensity to swell, causing rippling of those parts of the membrane positioned inside the channels of adjacent bipolar plates. This generated rippling is found to contribute largely towards the onset of a major disadvantage, lying in the decreased contact surface area between this rippled membrane and the electrodes of the elementary cell, this decrease translating directly as a reduction in the ion exchange surface between these different parts. The above-mentioned disadvantage therefore leads to the sole location of electrochemical activity in those membrane portions in contact with the electrodes, these portions consisting solely of the vertex of the ripples occurring at the time of membrane swelling.

Evidently, this highly specific locating of electrochemical activity causes accelerated ageing of the ion exchange membrane at the portions concerned, this localized ageing leading to the formation of cracks which may possibly cause short circuiting of the fuel cell, when the level of deterioration is such that the cracks have propagated to the point of leading into one another.

Also, it is to be noted that during assembly by clamping together a bipolar plate and an elementary cell, a gasket positioned between these two parts is designed to undergo deformation, so as to ensure a perfect seal between these various parts. However, other observations made have also led to the conclusion that deformation of the gasket inevitably causes deformation of that part of the ion exchange membrane located close to this gasket. Therefore it has been found that the square section shape chosen for the electrodes, membrane and bipolar plate is not at all suitable to allow the membrane to tolerate deformation of the gasket occurring during the clamping operation. Consequently, the deformations of the membrane portions located close to the gasket also undergo accelerated ageing which may cause spontaneous formation of localized cracks on this membrane.

DESCRIPTION OF THE DISCLOSURE

The subject of the invention is therefore firstly to put forward an elementary cell for fuel cell comprising two electrodes between which an ion exchange membrane is positioned, the cell overcoming at least in part the above-mentioned disadvantages of embodiments in the prior art.

More precisely, the purpose of the invention is to provide an elementary cell for fuel cells whose design significantly increases the lifetime of the ion exchange membrane.

A further subject of the invention is to propose a manufacturing method for said elementary cell.

Finally the invention also sets out to propose a fuel cell comprising a plurality of elementary cells such as those meeting the above-mentioned purpose of the invention.

To achieve the same, the subject of the invention is an elementary cell for fuel cells comprising two electrodes between which an ion exchange membrane is positioned. According to the invention one of the two electrodes has a threaded surface carrying the ion exchange membrane, the assembly formed by this electrode and the ion exchange membrane being able to be assembled by screwing onto a threaded surface belonging to the other of the two electrodes.

Advantageously, the elementary cell of the invention is designed so that when mounting the assembly formed by one of the two electrodes and the ion exchange membrane onto the other electrode, the ion exchange membrane comes to be confined between two threaded surfaces, enabling it to be placed under continuous pressure as the screwing operation progresses. In this manner, when the assembly operation is completed, the mechanical demands placed on the membrane are substantially uniformly distributed over its entire surface in contact with the two electrodes, without showing any deformed zones as was the case in embodiments of the prior art. It is to be noted in this respect that the absence of significant deformations on the ion exchange membrane is partly due to the sinusoidal shape of the threads on the threaded surfaces, these threads greatly minimizing stress concentrations on the membrane held between these two surfaces.

Therefore, the use of said elementary cell does not foster the creation of accelerated ageing zones on the ion exchange membrane, which advantageously prevents cracking of the latter and consequently considerably increases its lifetime compared with embodiments of the prior art.

Also, with said arrangement of means, the threaded surfaces of the two rigid electrodes do not allow the ion exchange membrane to ripple during operation of the fuel cell comprising said cell. The swelling of the membrane due to its impregnation with water causes its flattening against the electrode, so that the contact surfaces between these electrodes and the membrane are in no way reduced. Therefore, the electrochemical reaction occurs over a large part of the membrane, thereby preventing accelerated ageing of certain portions of this membrane.

Also, one advantage of the present invention lies in the increase, relative to the prior art, in the exchange surface area between the ion exchange membrane and the electrodes. While the parts contained in the prior art have substantially planar contact surfaces, the elementary cell of the invention has helical-type exchange surfaces which consequently generate growth of current density able to be produced.

Preferably, the ion exchange membrane has two threaded surfaces able to cooperate respectively with the threaded surfaces of the two electrodes, all these surfaces being made so that they have the same pitch.

Therefore it is possible to fabricate the ion exchange membrane using a film preformed to the pitch of the threaded surfaces of the two electrodes.

Preferably, one of the two electrodes consists of a coating deposited on a screw, and the other of the two electrodes consists of a coating deposited on a nut formed in a substrate.

With said configuration, provision can be made for the screw and substrate to be made in a porous material able to permit diffusion of the reagents in the direction of the electrodes. Also, the screw and substrate are respectively provided with at least one orifice in which at least one reagent may be injected.

According to one preferred embodiment of the present invention, the ion exchange membrane is carried by the electrode deposited on the screw, and each orifice provided in the substrate leads directly into a space delimited at least in part by the threaded surface of the electrode deposited on the nut, allowing the passage of each reagent in the interstices of a helical connection between the threaded surface of the electrode deposited on the nut and the ion exchange membrane.

Also, the invention concerns a fuel cell comprising a plurality of elementary cells subject of the invention and described above, the cells being electrically connected together and having a common substrate. As an example, by arranging the nuts in matrix shape, the exchange surface can be as much as approximately twenty times larger than the exchange surface of a conventional fuel cell in the prior art, but of substantially similar size.

Finally the invention also concerns a method for manufacturing said elementary cell for a fuel cell.

Other characteristics and advantages of the invention will become apparent in the following, non-restrictive, detailed description.

SHORT DESCRIPTION OF THE DRAWINGS

Figure 2:
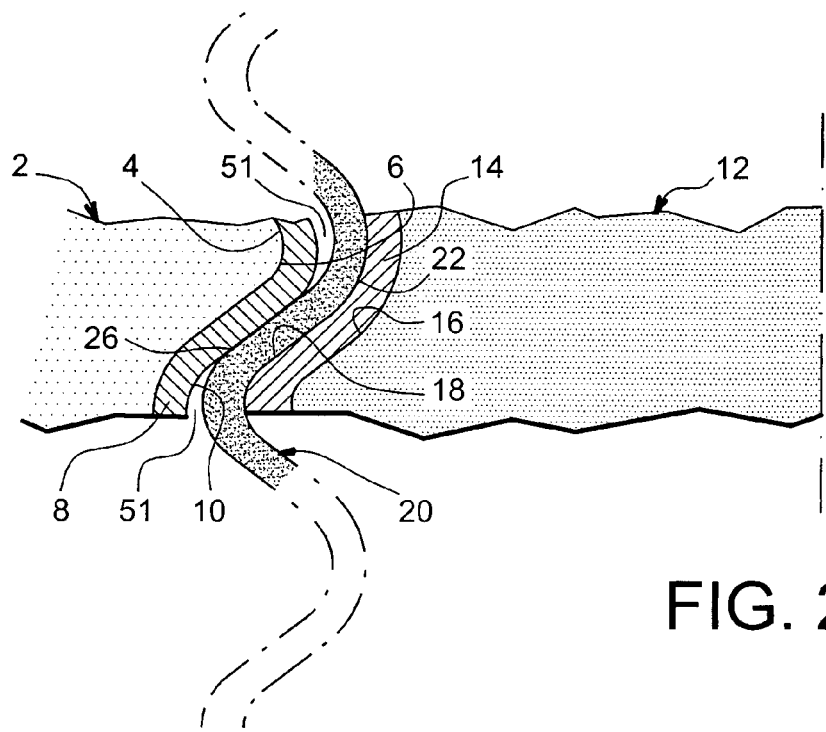
Figure 3:
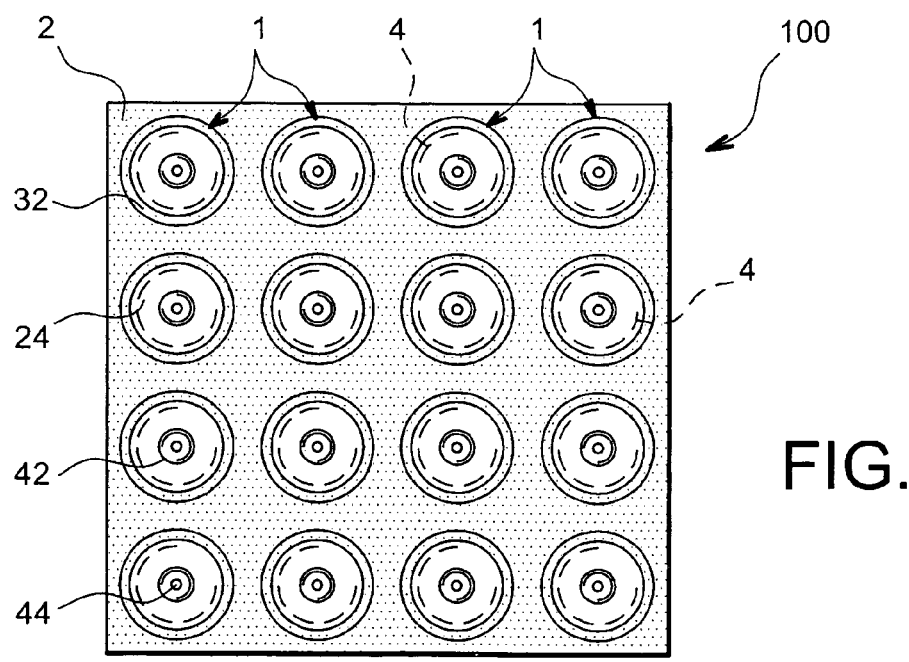

This description is made with reference to the appended drawings in which:

FIG. 1 is a schematic showing a front section view of an elementary cell according to one preferred embodiment of the present invention, FIG. 2 is larger-scale view of part of the elementary cell shown in FIG. 1, and FIG. 3 is partial overhead schematic of a fuel cell comprising a plurality of elementary cells such as shown in FIG. 1.

DETAILED DESCRIPTION OF PREFERRED EMBODIMENTS

With reference to FIGS. 1 and 2, an elementary cell 1 can be seen for a fuel cell according to one preferred embodiment of the present invention.

Elementary cell 1, able for example to deliver a power of between 10 and 50 kW when forming part of medium-powered fuel cells, may be used in any type of fuel cell such as PEMFC cells nod DMFC cells.

Elementary cell 1 comprises a substrate 2 preferably made in porous material, in which a nut 4 is formed having a threaded surface 6.

A first electrode 8, preferably in graphite, silicon, ceramic or metal foam, is deposited in the form of a coating on threaded surface 6 of nut 4, and also has a threaded surface 10 of smaller diameter and identical pitch to threaded surface 6 of nut 4. The first electrode 8 may indifferently either extend over the entire height of threaded surface 6 of nut 4, or only on a portion of this threaded surface 6.

Elementary cell 1 also comprises a screw 12 preferably made in a porous material.

A second electrode 14, preferably in graphite, silicon, ceramic or metal foam, is deposited in the form of a coating on a threaded surface 16 of screw 12, and also has a threaded surface 18 of larger diameter and identical pitch to threaded surface 16 of screw 12. It is to be noted that the pitch of threaded surface 16 is identical to the pitch of threaded surface 6 of nut 4. In the same way as for the first electrode 8 of elementary cell 1, the second electrode 14 may indifferently either extend over the entire height of threaded surface 16 of screw 12, or only over a portion of this threaded surface 16. Preferably, the two electrodes 8 and 14 are arranged so that when screw 12 is in place on nut 4, these two electrodes 8 and 14 face one another and extend over an identical height.

An ion exchange membrane 20, preferably of film type preformed to the pitch of threaded surfaces 6, 10, 16, 18 is mounted on threaded surface 18 of the second electrode 14, so that a first threaded surface 22 of the ion exchange membrane 20 has surface contact with the threaded surface 18 of the second electrode 14. For this purpose, provision may be made for example for ion exchange membrane 20 to be elastic and have a diameter that is slightly smaller than the diameter of the threaded surface 18 of second electrode 14, so that after mounting by screwing the two threaded surfaces under consideration 18 and 22 are arranged relative to one another so that their contours entirely fit one another. It is specified that the ion exchange membrane 20 is designed to extend entirely around second electrode 14, but also comprises an annular portion 23 connected to the part extending entirely around second electrode 14, the annular portion 23 being positioned under the head 24 of screw 12 of elementary cell 1.

The assembly formed by screw 12, second electrode 14, threaded surface 18 of the second electrode 14 and ion exchange membrane 20 is assembled by screwing onto the threaded surface 10 of first electrode 8. To facilitate screwing and limit deformation of this membrane 20 during the assembly operation, provision may be made for ion exchange membrane 20 to be preformed so as to have a second threaded surface 26 able to cooperate with threaded surface 10 of the first electrode 8, so as to set up a helical connection between the first electrode 8 and membrane 20 of elementary cell 1.

Therefore, the second threaded surface 26 of membrane 20 is made so as to have the same pitch as the other threaded surfaces 6, 10, 16, 18 of elementary cell 1, and a slightly larger diameter than the diameter of threaded surface 10 of first electrode 8. In this manner, when the above-mentioned assembly is assembled onto substrate 2 of cell 1, the ion exchange membrane 20 is placed under pressure between the two threaded surfaces 10, 18 of the two electrodes 8, 14 of the cell.

Also, still with reference to FIGS. 1 and 2, substrate 2 of elementary cell 1 comprises a cylindrical embossment 28 in which nut 4 is partly made, this embossment 28 projecting outside the main body 30 of this substrate 2. It is to be noted that cylindrical embossment 28 is preferably provided with a plurality of fins 32 facilitating cooling of cell 1, these fins 32 being in the shape of cylindrical crowns spaced around the outer surface of embossment 28.

Also, the head of screw 24 comprises an annular groove 34 at a lower surface intended to be placed up against cylindrical embossment 28 of substrate 2. Similarly, an annular groove 36 is positioned at an upper surface of cylindrical embossment 28 and arranged substantially opposite annular groove 34 provided on screw 12 when the latter is assembled onto substrate 2 of elementary cell 1. O-rings 38, 40 are respectively intended to be positioned inside annular grooves 34 and 36 and to enter into contact with annular portion 23 of the ion exchange membrane 20 so as to form a seal for elementary cell 1.

It is to be noted that this seal is made so as to maintain one or more reagents associated with each of the two electrodes 8 and 14, respectively in substrate 2 and in screw 12.

For this purpose, screw 12 is provided at its head 24 with an end part 42 that is preferably threaded, able to cooperate with injection means (not shown) for injecting one or more reagents intended to supply the second electrode 14. End part 42 has an inner cylindrical orifice 44 whose axis is identical to the axis of screw 12, this orifice 44 extending substantially over the entire length of screw 12. The reagent or reagents used are then able to take this opening 44 in the shape of a longitudinal channel and to diffuse in the direction of the first electrode 8 circulating inside screw 12 made in a porous material. The helical contact zone between threaded surface 18 of the second electrode 14 and the first threaded surface 22 of membrane 20 then forms an exchange surface on which a first electrochemical reaction can occur.

Evidently, it can also be contemplated to make provision for other orifices of any shape in screw 12 while remaining within the scope of the invention.

Also, substrate 2 at its lower surface comprises an end part 46 preferably in the shape of a threaded bore, able to cooperate with injection means (not shown) for injecting one or more reagents intended to supply the first electrode 8.

End part 46 is extended by a cylindrical orifice 48 having an identical axis to the axis of the screw 12 and nut 4 of elementary cell 1. Orifice 48 leads to inside a space 50 partly delimited by threaded surface 10 of the first electrode 8. As illustrated in FIG. 1, space 50 corresponds to a lower part of a recessed zone defined by nut 4 and/or threaded surface 10 of the first electrode 8, this lower part not being occupied by screw 12 when it is assembled onto substrate 2. In addition it is specified that space 50, into which cylindrical orifice 48 opens, is also delimited by the ion exchange membrane 20, the latter having a substantially planar disc-shaped portion 52 extending perpendicular to the axis of screw 12, and forming a cover at the threaded end of this screw 12. Consequently, the threaded part of screw 12 and second electrode 14 are entirely confined within the ion exchange membrane 20 so that the reagents injected into screw 12 are unable to enter into contact with the reagents injected into substrate 2.

The reagent or reagents used are then able to take orifice 48 in the shape of a longitudinal channel and to enter inside space 50. With said configuration, each reagent present in space 50 is able to filter into interstices 51 of the helical connection existing between the first electrode 8 deposited on nut 4 and the ion exchange membrane 20. A conventional helical connection such as provided between the above-mentioned parts is such that contact zones exist between the parts as well as zones in which the two parts are spaced away from one another. In these latter zones which communicate together, also named interstices of the helical connection, the fluid or liquid reagents may circulate freely so as to distribute themselves along the entire length of the connection in homogeneous manner.

It is to be noted that when said concept is adopted for elementary cell 1, interstices 15 allow homogeneous circulation of the reagents on the first electrode 8, while the function of the contact zones between surface 10 and surface 26 is to act as exchange surface on which a second electrochemical reaction is able to occur.

Evidently, it is also possible to consider a conventional solution in which the reagent or reagents are injected into one or more orifices of any shape provided in substrate 2, this latter then being made in a porous material able to allow diffusion of the reagents in the direction of first electrode 8.

Also, the invention concerns a method for manufacturing an elementary cell for fuel cells, such as the one just described.

According to one preferred embodiment of this method, the ion exchange membrane 20 is firstly preformed, in particular using screw 12. Therefore, on completion of this operation preferably conducted in a vacuum, membrane 20 can be given first and second threaded surfaces 22 and 26 having an identical pitch to that of threaded surface 16 of screw 12.

Subsequently, second electrode 14 is deposited in the form of a coating on threaded surface 16 of screw 12, depositing being conducted using conventional methods such as Chemical Vapour Deposition or Physical Vapour Deposition.

The coating obtained further to the preceding step is then machined so that second electrode 14 is provided with threaded surface 18 intended to receive the first threaded surface 22 of the ion exchange membrane 20.

In similar manner, substrate 2 comprises a nut 4 on which a coating is deposited to form the first electrode 8, again using the above-mentioned conventional depositing methods. The coating obtained is then tapped so that first electrode 8 has threaded surface 10 intended to receive the second threaded surface 26 of the ion exchange membrane 20.

Once electrodes 8 and 14 are made, assembly can be started by screwing ion exchange membrane 20 onto the threaded surface 18 of second electrode 14. It is to be noted that since membrane 20 is preformed to the diameter of screw 12 and not to the diameter of threaded surface 18 of second electrode 14 which is larger, membrane 20 entirely fits the contour of threaded surface 18 of this second electrode. Consequently, there are no interstices between threaded surface 18 of second electrode 14 and the first threaded surface 22 of the ion exchange membrane 20.

Finally the assembly formed by ion exchange membrane 20, second electrode 14 and screw 12 only needs to be screwed onto threaded surface 10 of first electrode 8 so as to obtain elementary cell 1 whose ion exchange membrane is under pressure between the two electrodes 8 and 14.

With reference to FIG. 3, a fuel cell 100 is partly shown according to one preferred embodiment of the invention, fuel cell 100 comprising a plurality of elementary cells 1 such as just described.

In this preferred embodiment, substrate 2 is common to all elementary cells 1, and nuts 4 carrying screws 12 are arranged matrix fashion on this substrate 2. Substrate 2 is therefore designed to supply each of first electrodes 8 coating nuts 4. In addition, electrodes 8 and 14 (not shown in FIG. 3) of cells 1 are electrically connected together, so that the power delivered by fuel cell 100 corresponds to the sum of the powers generated by each elementary cell 1 forming fuel cell 100.

Therefore, with extremely compact volume, the overall exchange surface of fuel cell 100, corresponding to the sum of the exchange surfaces of each of elementary cells 1, is largely increased relative to the surface obtained in fuel cells of the prior art. By way of example, and for a substrate 2 having a square section of approximately 25 cm$^2$, it is very easily possible to multiply by twenty the value of the exchange surface compared with a conventional fuel cell of the prior art using a bipolar plate of similar size to substrate 2. It is to be noted that the increase in exchange surface is due firstly to the multiplicity of elementary cells 1 arranged on one same substrate 2, and secondly to the helical shape of the exchange surfaces. Also, through the high number of elementary cells 1 on substrate 2, should one or a small number thereof become damaged, the assembly of the other cells 1 is able to maintain substantially identical power production to that produced by all cells 1.

Also, it is specified that the matrix arrangement of elementary cells 1 enables maintenance operations without having to dismount the whole of the fuel cell, insofar as each of elementary cells 1 is individually accessible. Also, the matrix arrangement facilitates the implanting of reserve parts, the latter simply replacing parts that have become defective and likely to short circuit.

Evidently, various modifications may be made by persons skilled in the art to elementary cell 1, fuel cell 100 and to the method for manufacturing elementary cell 1 described in the foregoing solely as non-restrictive examples.

The invention claimed is:

1. Elementary cell (1) for fuel cell (100) comprising two electrodes (8,14) between which an ion exchange membrane (20) is positioned, characterized in that one of said two electrodes (14) has a threaded surface (18), the threaded surface carrying the ion exchange membrane (20), an assembly formed by said one of said two electrodes (14) and the ion exchange membrane (20) being able to be assembled by screwing onto a threaded surface (10) belonging to the other of said two electrodes (8), and further characterized in that one of said two electrodes (14) includes a coating deposited on a screw (12), and in that the other of said two electrodes (8) includes a coating deposited on a nut (4) formed in a substrate (2).

2. Elementary cell (1) as in claim 1, characterized in that the ion exchange membrane (20) is a preformed film.

3. Elementary cell (1) as in claim 1, characterized in that screw (12) and substrate (2) are made in a porous material able to allow diffusion of the reagents in direction of electrodes (8, 14).

4. Elementary cell (1) as in claim 1, characterized in that screw (12) is provided with at least one orifice (42) in which at least one reagent is able to be injected.

5. Elementary cell (1) as in claim 1, characterized in that substrate (2) is provided with at least one orifice (48) in which at least one reagent is able to be injected.

6. Elementary cell (1) as in claim 5, characterized in that the ion exchange membrane (20) is carried by electrode (14) deposited on said screw (12), and in that each orifice (48) provided in substrate (2) leads directly into a space (50) delimited at least in part by threaded surface (10) of electrode (8) deposited on nut (4), allowing the passage of each reagent inside interstices (51) of a helical connection between threaded surface (10) of electrode (8) deposited on nut (4) and the ion exchange membrane (20).

7. Fuel cell (100), characterized in that it comprises a plurality of elementary cells (1) as in claim 1, said cells (1) being electrically connected together.

8. Fuel cell (110) as in claim 7, characterized in that the elementary cells (1) comprise a common substrate (2) in which nuts (4) are made so as to be arranged matrix fashion.

9. Elementary cell (1) as in claim 1, characterized in that the threaded surfaces (10, 18, 22, 26) of said two electrodes (8, 14) and of ion exchange membrane (20) have the same pitch.

* * * * *